US006936334B2

(12) United States Patent
Blazey et al.

(10) Patent No.: US 6,936,334 B2
(45) Date of Patent: Aug. 30, 2005

(54) STEGANOGRAPHICALLY ENCODED MEDIA OBJECT HAVING AN INVISIBLE COLORANT

(75) Inventors: Richard N. Blazey, Penfield, NY (US); Kevin W. Williams, Rochester, NY (US); Gustavo R. Paz-Pujalt, Rochester, NY (US); Thomas M. Stephany, Churchville, NY (US)

(73) Assignee: Eastman Kodak Company, Rochester, NY (US)

( * ) Notice: Subject to any disclaimer, the term of this patent is extended or adjusted under 35 U.S.C. 154(b) by 93 days.

(21) Appl. No.: 10/165,064

(22) Filed: Jun. 7, 2002

(65) Prior Publication Data

US 2003/0228980 A1 Dec. 11, 2003

(51) Int. Cl.[7] .................................................. B32B 3/00
(52) U.S. Cl. ..................... 428/195.1; 283/902; 428/916
(58) Field of Search ............................. 428/195.1, 916, 428/29; 283/902, 91–93

(56) References Cited

U.S. PATENT DOCUMENTS

| | | | | | |
|---|---|---|---|---|---|
| 3,886,083 | A | * | 5/1975 | Laxer | 252/301.2 R |
| 4,866,025 | A | | 9/1989 | Byers et al. | 503/227 |
| 4,866,027 | A | | 9/1989 | Henzel | 503/227 |
| 4,942,141 | A | | 7/1990 | DeBoer et al. | 503/227 |
| 4,950,640 | A | | 8/1990 | Evans et al. | 503/227 |
| 5,586,787 | A | * | 12/1996 | Brown et al. | 283/67 |

* cited by examiner

*Primary Examiner*—Bruce H. Hess
(74) *Attorney, Agent, or Firm*—Peyton C. Watkins

(57) ABSTRACT

A medium for displaying information thereon, the medium includes a substrate; and visible information formed from a plurality of colors displayed on the substrate; wherein at least one of the colors includes at least one visible colorant and at least one invisible colorant which invisible colorant is imperceptible to the human eye and which is not present in a reproduction therefrom for detecting counterfeiting or forgery.

6 Claims, 4 Drawing Sheets

STEGANOGRAPHICALLY ENCODED MEDIA OBJECT HAVING AN INVISIBLE COLORANT

FIELD OF THE INVENTION

The invention relates generally to the field of steganography and, more particularly, to such steganography which integrally combines a visible colorant with an invisible colorant which invisible colorant is imperceptible to the human eye and which is not present in a reproduction therefrom for detecting counterfeiting, forgery or the like.

BACKGROUND OF THE INVENTION

"I would never put it in the power of any printer or publisher to suppress or alter a work of mine, by making him master of the copy" Thomas Paine, Rights of Man, 1792.

"The printer dares not go beyond his licensed copy" Milton, Aeropagetica, 1644.

Since time immemorial, unauthorized use and outright piracy of proprietary source material has been a source of lost revenue, confusion, and artistic corruption.

These historical problems have been compounded by the advent of digital technology. With it, the technology of copying materials and redistributing them in unauthorized manners has reached new heights of sophistication, and more importantly, omnipresence. Lacking objective means for comparing an alleged copy of material with the original, owners and litigation proceedings are left with a subjective opinion of whether the alleged copy is stolen, or has been used in an unauthorized manner. Furthermore, there is no simple means of tracing a path to an original purchaser of the material—something which can be valuable in tracing where a possible "leak" of the material first occurred.

A variety of methods for protecting commercial material have been attempted. One method is to embed information in the document or image that is imperceptible to the human eye and which is copied into reproductions. The embedded information includes data that permits the copyright owner to discern copies from the original so that illegal copying is detected.

Although the presently known and utilized media having steganography and methods using steganography are satisfactory, they include drawbacks. One such drawback is that, upon copying the reproduced copy over and over again, the embedded data may become degraded so that the data is not decodable. Another drawback is that image processing, such as scaling, rotation and the like, may also degrade the embedded data so that it is not decodable. Another drawback is that exact copies of images containing steganographic data reproduce that information as well as the original so that copies cannot easily be distinguished from the original by the presence of the steganographic mark. While the presence of the steganographic mark authenticates the original as legitimate and prevents the creation of an altered copy of the original, it does not distinguish between an exact copy of the original and the original itself.

Consequently, a need exists for a form of embedded data which is not reproduced in photocopies so that all subsequent copies (i.e., those which do not contain the unreproducable embedded data) are identifiable as photocopies so that fraudulent photocopies are easily detected. It is noted that this is the inverse of the currently known embedded steganography which passes the embedded data to photocopies.

SUMMARY OF THE INVENTION

The present invention is directed to overcoming one or more of the problems set forth above. Briefly summarized, according to one aspect of the present invention, the a medium for displaying information thereon, the medium comprising (a) a substrate; (b) visible information formed from a plurality of colors displayed on the substrate; wherein at least one of the colors includes at least one visible colorant and at least one invisible colorant which invisible colorant is imperceptible to the human eye and which is not present in a reproduction therefrom for detecting counterfeiting or forgery.

These and other aspects, objects, features and advantages of the present invention will be more clearly understood and appreciated from a review of the following detailed description of the preferred embodiments and appended claims, and by reference to the accompanying drawings.

Advantageous Effect of the Invention

The present invention has the following advantages of detecting original copyrighted media by illuminating the media of interest with infrared light for detecting data which is imperceptible to the human eye and which is lost upon reproduction.

DETAILED DESCRIPTION OF THE INVENTION

Figure 1:
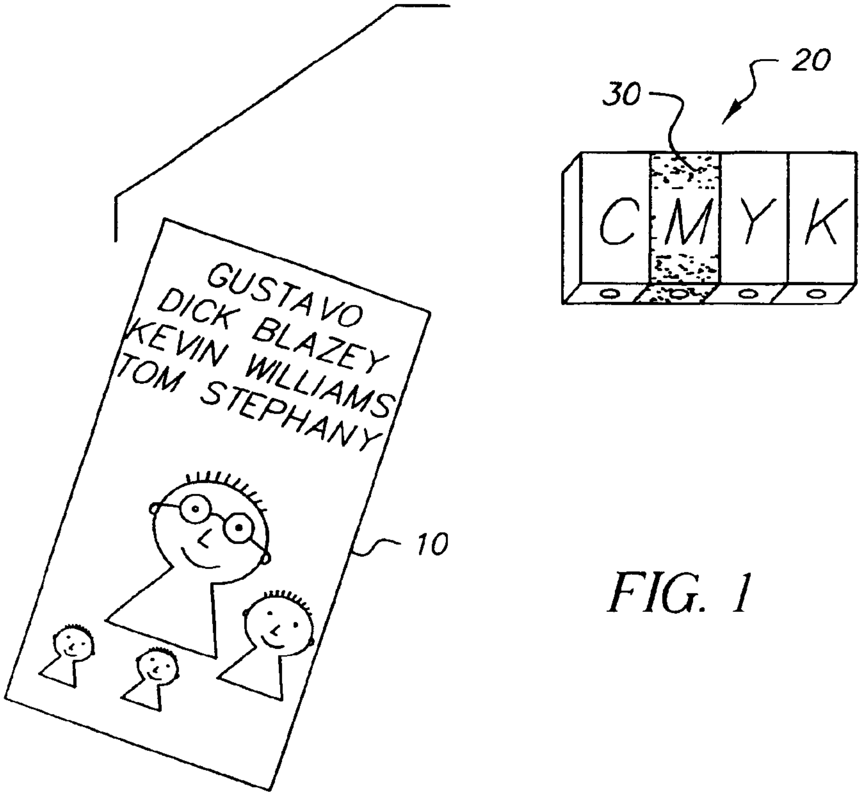
FIG. 1 is a drawing of a typical hardcopy image of the present invention encoded with the at least one invisible colorant.

Referring to FIG. 1, there is shown a medium 10, such a paper, forming a substrate onto which text, graphics, images and the like (hereinafter referred to visible information) may be displayed. The visible information is formed from a plurality of colorants 20, such as cyan, magenta, yellow and black (CMYK) that is placed on the substrate via any suitable means. Such means are well known in the art and will not be discussed herein.

One of the colorants, for example magenta, includes an invisible colorant 30 that is substantially non-reflective or luminesce in the visible wavelengths. Although magenta is used in the preferred embodiment, any one or any combination of the CMYK colorants 20 could include an invisible colorant.

The invisible colorant 30 is typically formed from an ultraviolet (UV) or infrared (IR) absorbing dye, pigment or ink. As used herein, UV is defined as a colorant having substantially all of its absorption at below 400 nanometers, and an IR dye, pigment or ink has substantially all of its absorption at or above 800 nanometers. The UV materials and the IR materials may be those as those described in U.S. Pat. Nos. 4,866,027 and 4,866,025 for UV and U.S. Pat. Nos. 4,950,640 and 4,942,141 for IR, but are not limited to those disclosures.

Figure 2:
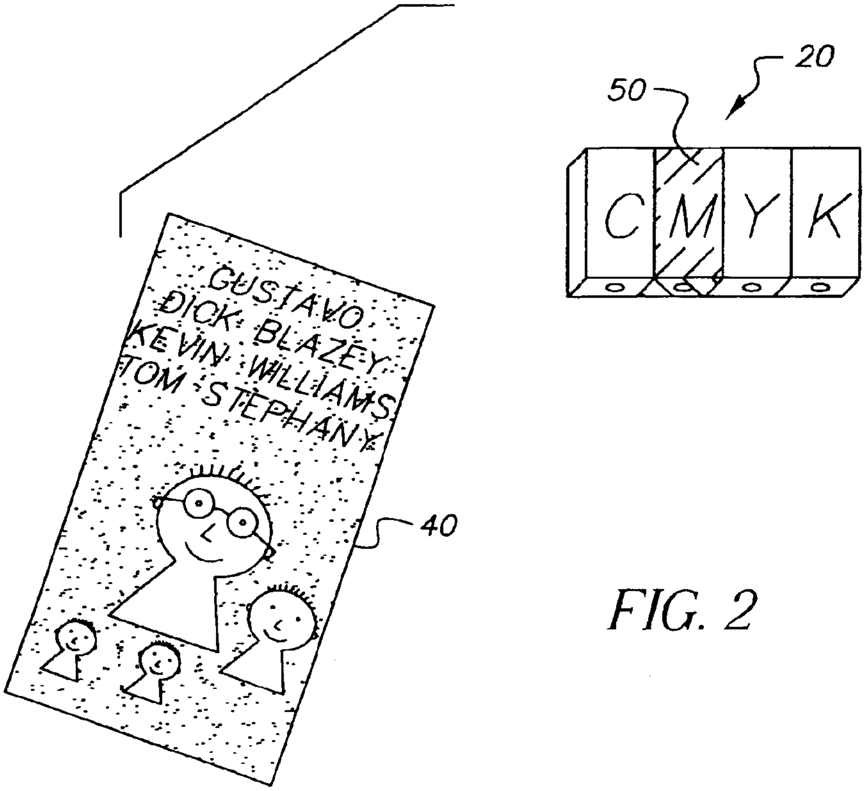
FIG. 2 is an alternative embodiment of FIG. 1 illustrating a different substrate for the hardcopy image of the present invention.

Referring to FIG. 2, there is shown a medium 40 having one or more different physical properties or characteristics than the medium 10. This illustrates that, for example, a plain paper receiver (i.e., medium 10) would require different dyes, pigments or inks 20 than a receiver (i.e., medium 40) constructed from biaxially oriented polyethylene for compatibility. Those skilled in the art will readily recognize the different dyes, pigments or inks required to be used. To illustrate this, a compatible invisible colorant 50, for example magenta, would be required to be used. As in the previous embodiment, although magenta is used for the invisible colorant 50, any one or any combination of the colorants 20 may contain the invisible colorant.

Figure 3:
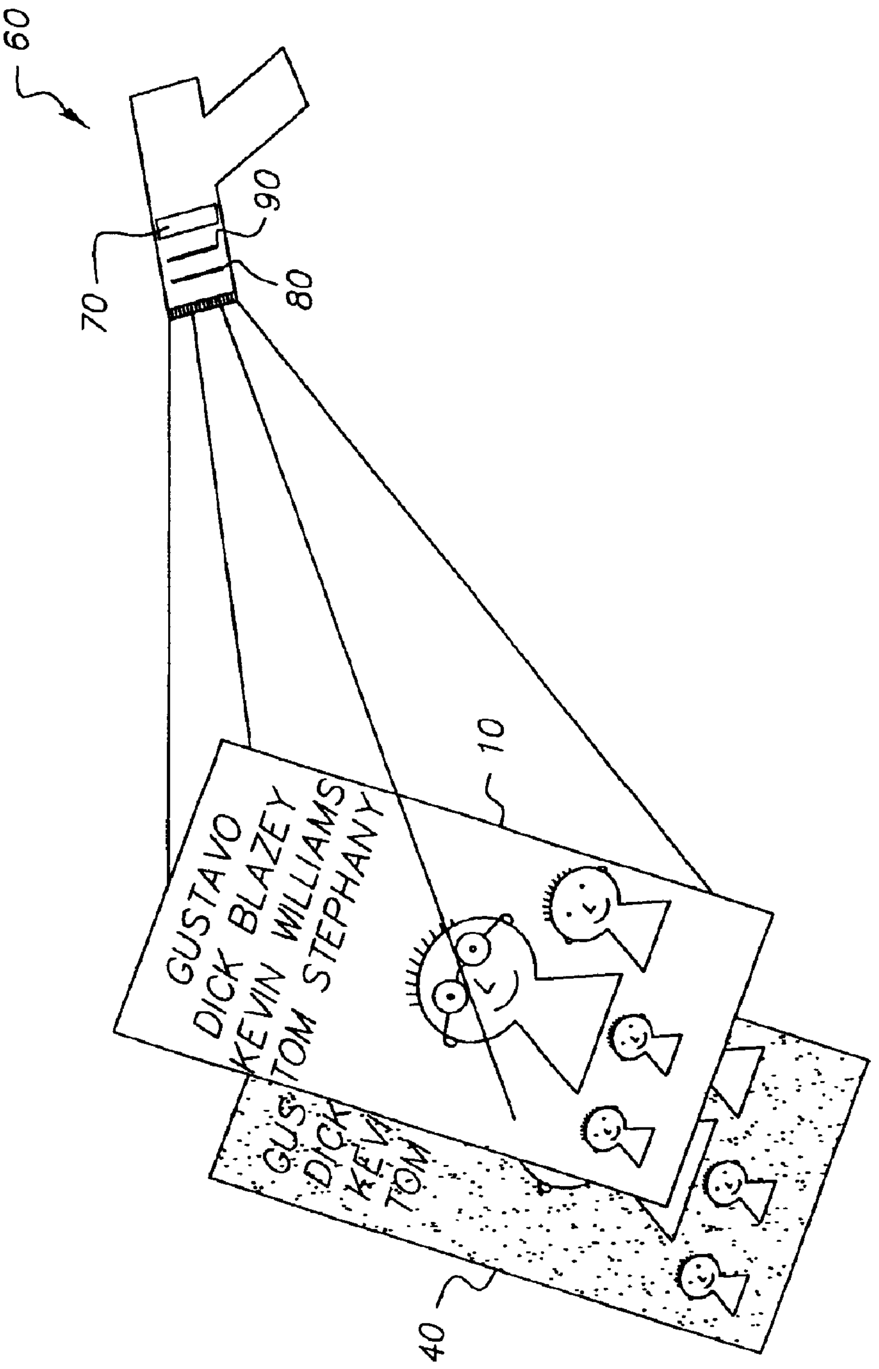
FIG. 3 is an illustration of an illumination source illuminating the hardcopy images of FIGS. 1 and 2.

Referring to FIG. 3, there is an illustration for detecting whether the mediums 10 and 40 are authorized copyrighted materials or are illegal copies. It is instructive to note that an illegal copy will not contain the invisible colorant because the invisible colorant is not reproduced in a photocopy; only the copyrighted material will contain the invisible material. In this regard, a combined reader and illumination source 60 contains a light source 70 that illuminates the mediums of interest 10 or 40 which causes the colorants to be reflected. It should be readily apparent that, although mediums 10 and 40 are both shown as being illuminated for understanding that both can be illuminated, only one will be illuminated at any given time in practice.

Figure 4:
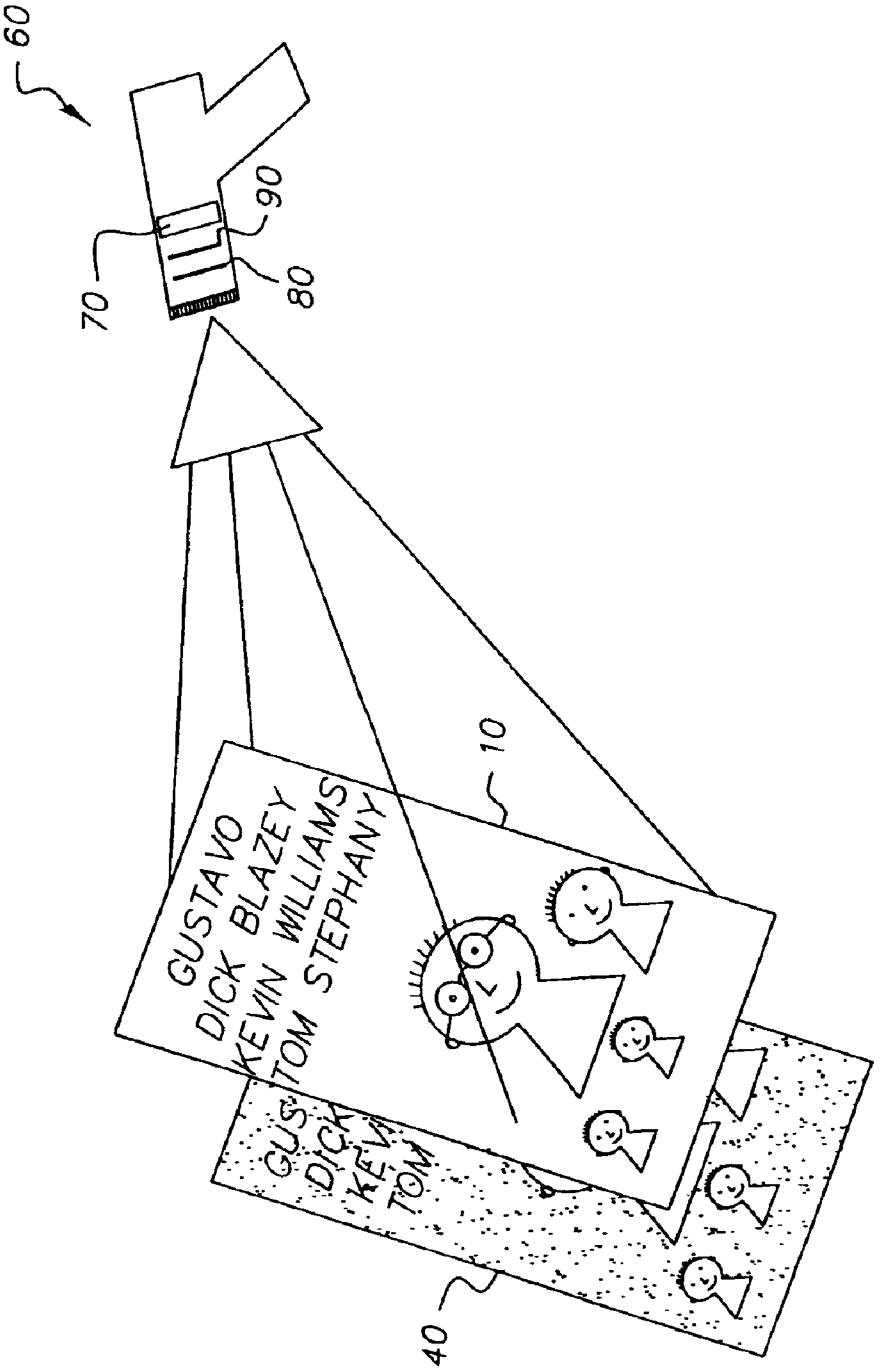
FIG. 4 is an illustration of the reflection from the hardcopy image of FIG. 3.

Referring to FIG. 4, there is shown an illustration of the reflected material from the mediums 10 or 40 as a result of being illuminated by the illumination source 60. The reflected light is passed through a filter 80 which removes substantially all visible light and passes only the invisible light. The invisible light is imaged upon an imaging device 90 such as a CMOS (complimentary metal oxide semiconductor) imager or a CCD (charge-coupled device) imager both of which are capable of reading or detecting the reflected invisible wavelength light that is invisible only to the human eye, but not to the imagers.

Figure 5:
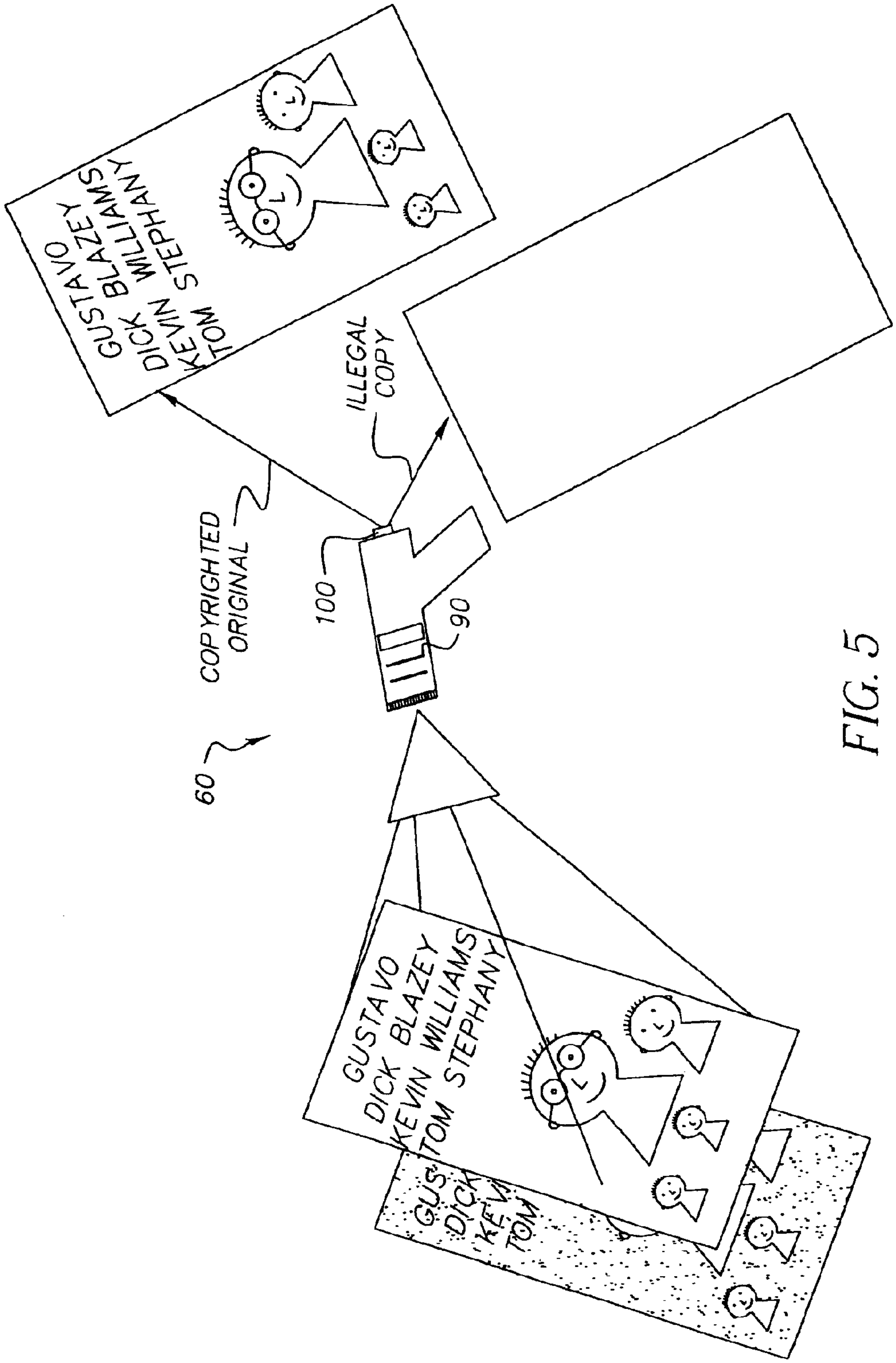
FIG. 5 is an illustration illumination source having an output mechanism for displaying to a user its results.

Referring to FIG. 5, there is shown an illustration of the reader and illumination source 60 having an output mechanism 100 such as LEDs which, when illuminating as a red color, alerts the user of an illegal copy or, when illuminating as a green color, alerts the user of a copyrighted original. A second embodiment of the output mechanism 100 can be a screen of some type such as an LCD or an OLED display which will image the invisible image to the human eye. An illustration of the operation of the dual reader and illumination device 60 is as follows. A media 10 or 40 having both visible 20 and invisible colorant 50, when illuminated by the dual reader and illumination device 60, both the visible and invisible wavelengths of light are reflected into the reading device 60. By filtering out the visible light, only the invisible light is imaged upon a detector 90 which is sensitive to that wavelength so that the image is detectable.

In contrast, a copy of the media processed on something such as a photocopier the photocopier will output an image without any invisible colorant. When the copied image is scanned and filtered by the reading device no light will pass through the filter thus detecting an illegal copy.

The invention has been described with reference to a preferred embodiment. However, it will be appreciated that variations and modifications can be effected by a person of ordinary skill in the art without departing from the scope of the invention.

| PARTS LIST | |
|---|---|
| 10 | first medium |
| 20 | visible colorant |
| 30 | invisible colorant |
| 40 | second medium |
| 50 | invisible colorant |
| 60 | illumination source |
| 70 | light source |
| 80 | filter |
| 90 | imaging device |

What is claimed is:

1. A system for detecting counterfeiting or forgery, the system comprising:

a medium comprising:

(a) a substrate; and (b) visible information formed from a plurality of colors displayed on the substrate; wherein at least one of the colors includes at least one visible colorant and at least one invisible colorant which invisible colorant is imperceptible to the human eye and which invisible colorant absorbs, reflects or luminesces at wavelengths at or less than substantially 400 nanometers or at or more than substantially 800 nanometers; and wherein the invisible colorant is not transferred to a photocopy for detecting counterfeiting or forgery;

a reader comprising an imaging device that detects the absence of invisible colorant in a counterfeit medium of the medium for detecting counterfeiting or forgery and detects presence of invisible colorants in the medium for indicating the actual medium.

2. The system as in claim 1, wherein the invisible colorant used is dependent upon the characteristics of the medium.

3. The system as claim 1, wherein a plurality of the colors contain the invisible colorants.

4. A method for detecting forgery or counterfeiting, the method comprising the steps of:

(a) providing a substrate;

(b) inserting at least one invisible colorant that is imperceptible to a human eye on the substrate for permitting detection of a counterfeit of the substrate that will not have the invisible colorant; wherein the invisible colorant absorbs, reflects or luminesces at wavelengths at or less than substantially 400 nanometers or at or more than substantially 800 nanometers; and (c) inserting at least one visible colorant that is perceptible to the human eye on the substrate for permitting display on visible information on the substrate.

5. The method as in claim 4 further comprising the step of selecting the invisible colorant based on characteristics of the medium.

6. The method as claim 4, wherein step (b) includes inserting a plurality of invisible colorants.

* * * * *